(12) United States Patent
Lundström et al.

(10) Patent No.: US 7,660,461 B2
(45) Date of Patent: Feb. 9, 2010

(54) AUTOMATED HISTOGRAM CHARACTERIZATION OF DATA SETS FOR IMAGE VISUALIZATION USING ALPHA-HISTOGRAMS

(75) Inventors: Claes Lundström, Linköping (SE); Hans Knutsson, Linköping (SE)

(73) Assignee: Sectra AB, Linkoping (SE)

( * ) Notice: Subject to any disclaimer, the term of this patent is extended or adjusted under 35 U.S.C. 154(b) by 748 days.

(21) Appl. No.: 11/379,696

(22) Filed: Apr. 21, 2006

(65) Prior Publication Data

US 2007/0248265 A1    Oct. 25, 2007

(51) Int. Cl.
*G06K 9/00*        (2006.01)
(52) U.S. Cl. ........................ 382/168; 382/128; 382/169; 382/171
(58) Field of Classification Search ................. 382/128, 382/130, 168, 169, 171; 705/1; 345/424; 713/180; 600/300, 515; 235/380, 375, 376
See application file for complete search history.

(56) References Cited

U.S. PATENT DOCUMENTS 5,709,214 A * 1/1998 Skinner ...................... 600/300
6,985,612 B2 * 1/2006 Hahn .......................... 382/128

OTHER PUBLICATIONS

U.S. Appl. No. 11/137,160, filed May 25, 2005, Claes F. Lundstrom.
Andriole et al. "Addressing the Coming Radiology Crisis: The Society for Computer Applications in Radiology Transforming the Radiological Interpretation Process (TRIP™) Initiative" (website) <http://www.scarnet.net/trip/pdf/TRIP_White_Paper.pdf> (Nov. 2003).
Nyul et al. "On Standardizing the MR Image Intensity Scale" *Magnetic Resonance in Medicine* 42(6):1072-1081 (1999).
Maragos et al. "Morphological Systems for Multi-Dimensional Signal Processing" *Proceedings of the IEEE* 78(4):690-710 (1990).
Persson et al. "Volume Rendering Compared with Maximum Intensity Projection for Magnetic Resonance Angiography Measurements of the Abdominal Aorta" *Acta Radiologica* 45:453-459 (2004).
Persson et al. "Standardized Volume Rendering for MR Angiography Measurements in the Abdominal Aorta" *Acta Radiologica* 47(2):172-178 (2006).
Lundstrom et al. "Extending and Simplifying Transfer Function Design in Medical Volume Rendering Using Local Histograms" *Proceedings IEEE/EuroGraphics Symposium on Visualization* pp. 263-270 (2005).
Lundstrom, et al. "The α-histogram: Using Spatial Coherence to Enhance Histograms and Transfer Function Design" *Eurographics/IEEE-VGTC Symposium on Visualization* 9 pages (2006).
Wang et al. "Image Quality Assessment: From Error Visibility to Structural Similarity" *IEEE Transactions on Image Processing* 13(4) (2004).

* cited by examiner

*Primary Examiner*—Anh Hong Do
(74) *Attorney, Agent, or Firm*—Myers Bigel Sibley & Sajovec, P.A.

(57) ABSTRACT

Methods and apparatus are configured to provide data to generate and/or render (medical) images using medical volumetric data sets by electronically analyzing a medical volume data set associated with a patient that is automatically electronically divided into a plurality of local histograms having intensity value ranges associated therewith and programmatically generating at least one α-histogram of data from the local histograms used for at least one of peak detection, transfer function design or adaptation, tissue detection or tissue classification.

46 Claims, 16 Drawing Sheets

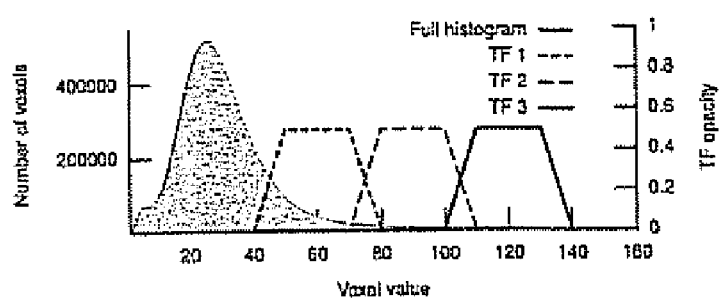
Figure 1
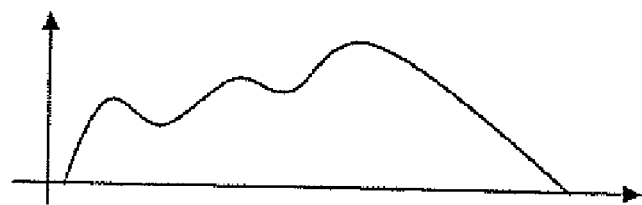
Figure 2: *Complex peak shapes.*

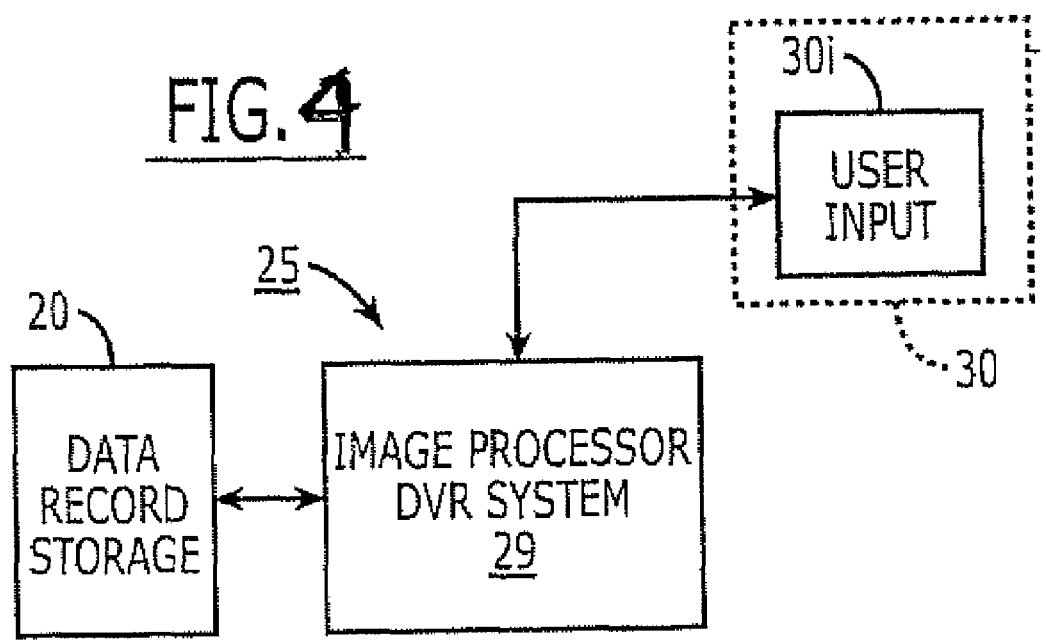

Generating at least one α histogram comprising similar data values from local histograms using respective local histogram data for each value "x" that is: (a) mathematically raised by a power of α, then (b) summed, whereby the α histogram includes data with spatial coherence

100

Peaks in the histogram related to tissue of spatial coherence will increase relative to the local histogram.

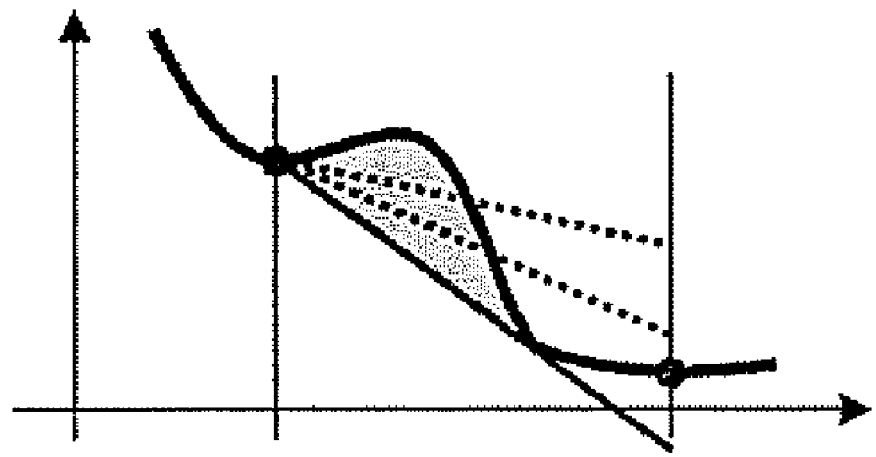
Figure 9. Definition of peak area. The base line is the solid red line, invalid base lines are dashed.

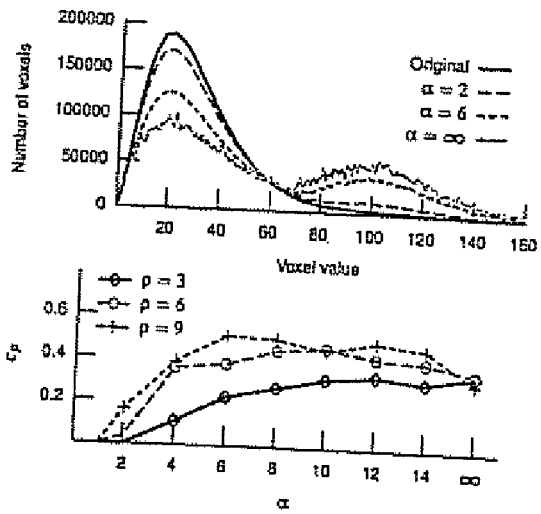
Fig. 12A
Fig. 12B
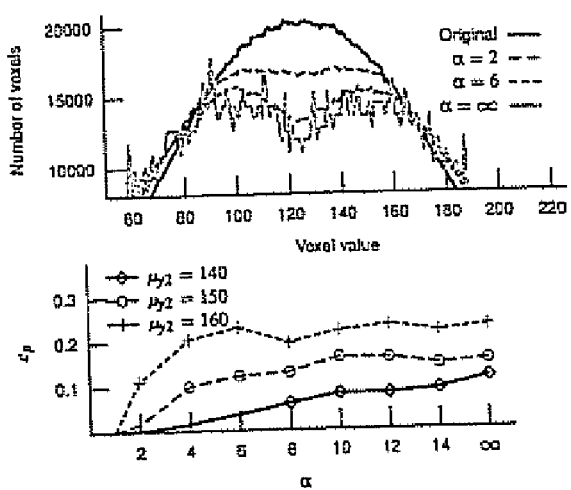
Fig. 13A
Fig. 13B

AUTOMATED HISTOGRAM CHARACTERIZATION OF DATA SETS FOR IMAGE VISUALIZATION USING ALPHA-HISTOGRAMS

FIELD OF THE INVENTION

The present invention relates to histogram analysis and may be particularly suitable for transfer function selection or design and medical renderings of imaging data.

RESERVATION OF COPYRIGHT

A portion of the disclosure of this patent document contains material to which a claim of copyright protection is made. The copyright owner has no objection to the facsimile or reproduction by anyone of the patent document or the patent disclosure, as it appears in the Patent and Trademark Office patent file or records, but reserves all other rights whatsoever.

BACKGROUND OF THE INVENTION

Histograms are used to characterize data sets, for example in Transfer Function design, because of their relatively high information content in a relatively simple format. Some data sets have uncalibrated and/or non-spatially defined features and can include data associated with features of interest as well as minor features, noise and/or materials with overlapping value ranges.

Direct Volume Rendering ("DVR") has been used in medical visualization research for a number of years. DVR can be generally described as rendering visual images directly from volume data without relying on graphic constructs of boundaries and surfaces, thereby providing a more complete visualization of internal structures from 3-D data. DVR holds promise for its diagnostic potential in analyzing medical image volumes. Slice-by-slice viewing of medical data may be increasingly difficult for the large data sets now provided by imaging modalities raising issues of information and data overload and clinical feasibility with current radiology staffing levels. See, e.g., *Addressing the Coming Radiology Crisis: The Society for Computer Applications in Radiology Transforming the Radiological Interpretation Process (TRIP™) Initiative*, Andriole et al., at URL scarnet.net/trip/pdf/TRIP_White_Paper.pdf (November 2003). In some modalities, patient data sets can have large volumes, such as greater than 1 gigabyte, and can even commonly exceed tens or hundreds of gigabytes.

Despite its potential, DVR has not achieved widespread use for non-research medical imaging, particularly in computer network systems with visualization pipelines. This may be because DVR may need time-consuming manual adjustment using conventional transfer functions (TF) and/or editing tools. That is, the TF construction can be relatively complex and/or the tissue separation abilities may not be sufficient, particularly where dissimilar tissues have similar intensity values limiting the ability to generate diagnostic clinical renderings.

SUMMARY OF EMBODIMENTS OF THE INVENTION

Embodiments of the invention employ at least one $\alpha$-histogram to identify spatially coherent data in images as an enhancement to the characterization of data sets of general histograms.

Embodiments of the present invention are directed to methods, systems and computer program products that employ $\alpha$ histogram data for direct volume renderings.

Embodiments of the present invention are directed to methods of evaluating histogram data. The methods include: (a) electronically identifying data values in a defined value range taken from a data set; (b) electronically mathematically raising identified data values by a power of $\alpha$, where $\alpha$ is greater than 1; and (c) electronically automatically summing the raised data values to generate an $\alpha$-histogram that amplifies spatially coherent histogram data values.

Other embodiments are directed to methods of evaluating data associated with medical volumetric data sets such as, for example, medical direct volume rendering data sets. The methods include: (a) electronically evaluating a plurality of local histograms to identify a set of data values of "x" in the respective local histograms, the local histograms derived from a direct volume rendering medical data set; then (b) electronically generating at least one $\alpha$-histogram comprising a summation of the identified histogram data values, whereby the identified local histogram data is raised to a power of $\alpha$ before summation.

Some embodiments are directed to methods for visualizing images of volume data sets. The methods include: (a) iteratively electronically subdividing a data set using local histograms of neighborhood voxel data to identify data sets of similar values within the local histograms; (b) mathematically raising by a power of $\alpha$, the identified data set values of the respective local histograms; then (c) electronically generating an $\alpha$-histogram comprising a sum of the raised identified data sets from each local histogram; and (d) adapting a transfer function using data from the $\alpha$-histogram to render an image.

Other embodiments are directed to systems for generating DVR medical images. The systems include a volume rendering medical image processor system configured to generate a diagnostic medical image of a target region of a patient by electronically analyzing a volume rendering data set using at least one histogram that mathematically increases selected data values to amplify local peaks associated with spatially coherent data. The peaks are generated from data derived from a plurality of local histograms of data of the volume rendering data set.

Still other embodiments are directed to computer program products for spatially correlating histogram data for rendering images using a computer network. The computer program product includes a computer readable storage medium having computer readable program code embodied in the medium. The computer-readable program code includes: computer readable program code configured to generate at least one $\alpha$-histogram having associated peak characteristics and intensity values to electronically identify different types of tissue having overlapping image intensity values to thereby provide data used to render a diagnostic medical image of a target region of a patient.

Some embodiments are directed to systems for visualizing images of volume data sets. The systems include: (a) a processor configured to generate a medical image from a voxel medical data set, the processor configured to electronically generating partial range histograms and at least one $\alpha$-histogram to generate the medical image; and (b) a clinician workstation in communication with the processor configured to display the medical image.

Some embodiments are directed to methods, systems, computer programs and/or apparatus that are configured to provide data to generate and/or render (medical) images (which may use direct volume rendering) by electronically analyzing a medical volume data set associated with a patient that is automatically electronically divided into a plurality of local histograms having intensity value ranges associated therewith, then programmatically generating an α-histogram of data from the local histograms used for at least one of peak detection, transfer function design or adaptation, tissue detection or tissue classification of tissue having overlapping intensity values.

It is noted that any of the features claimed with respect to one type of claim, such as a system, apparatus, or computer program, may be claimed or carried out as any of the other types of claimed operations or features.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 1 is a typical "normal" histogram of number of voxels versus voxel values and transfer functions of a data set.

FIG. 2 is a histogram with complex peak shapes according to some embodiments of the present invention.

FIG. 4 is a block diagram of a rendering system with a DVR image processor system according to embodiments of the present invention.

FIG. 5 is a flow chart of operations that may be used to enhance histogram analysis according to embodiments of the present invention.

FIG. 9 is a graph of a peak from an α histogram illustrating peak base line determination according to embodiments of the present invention.

FIG. 12A is a graph of number of voxels versus voxel values of the spiral data set for the structure shown in FIG. 10A. The graph includes α-histogram curves with different α values, with the peak amplification and noise being higher at the higher α values.

FIG. 12B is a graph of peak detection confidence versus different α values, with increasing a values generally improving peak detection confidence, but with noise reducing the confidence at very high α's.

FIG. 13A is a graph of number of voxels versus voxel values of the dual organ data set for the structure shown in FIG. 11A. The graph includes α-histogram curves with different α values, with the peak amplification and noise being higher at the higher α values.

FIG. 13B is a graph of peak detection confidence versus different α values, with increasing a values generally improving peak detection confidence which relatively quickly reaches a plateau for simpler detections.

DETAILED DESCRIPTION

Figure 3:
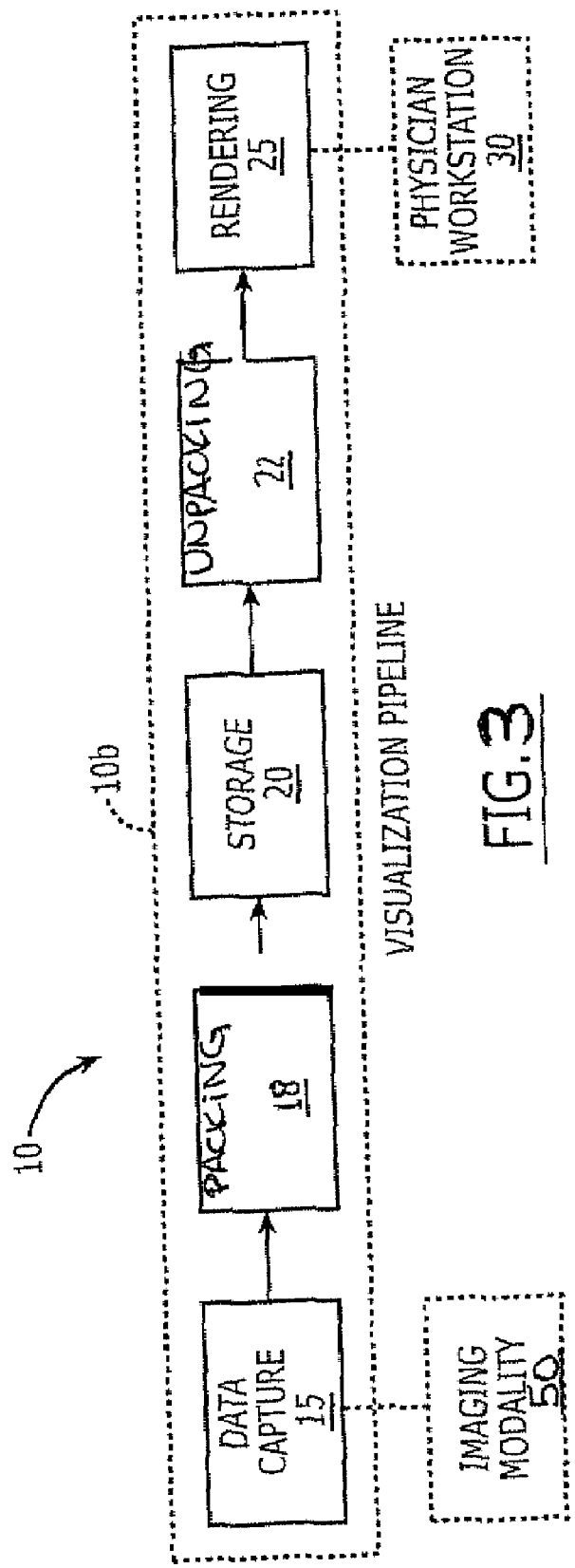
FIG. 3 is a block diagram of an electronic visualization pipeline according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. In the claims, the claimed methods are not limited to the order of any steps recited unless so stated thereat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Embodiments of the invention are applicable to any analysis using histograms. However, some embodiments are directed to histogram analysis for direct volume rendering. The term "Direct Volume Rendering" or "DVR" is well known to those of skill in the art. DVR comprises electronically rendering a medical image directly from volumetric data sets to thereby display color visualizations of internal structures using 3D data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

The term "global" or "full" data set means a data set (or subset of a data set) with the data in the data set having spatial information/relationship. The spatial relationship may not be retained when forming normal "full" histograms, such as a main histogram of the data set. For example, a volume rendering data set can be represented by a full data set of numbers of voxels versus voxel values that represent a target region of an image, such as of a portion of a patient's body. The data set and/or full histogram can be subdivided into local histograms. The term "local histogram" is a histogram for a single local neighborhood of data that can fit within the full histogram data set. The term "local neighborhood" means a related region of voxel intensity data. The related region of data may be of any desired shape or size and number of voxels. The local neighborhoods may be configured as defined or arbitrary, non-overlapping or overlapping subdivisions of voxel data from the volume rendering data set. The local neighborhoods may have the same shape and same size or different shapes and sizes. In some particular embodiments, each local neighborhood may contain at least about 50 voxels. In some examples, the local neighborhood can be cubical blocks that are about at least 6 voxels, and typically at least about 8 voxels, wide. Additional discussion of local neighborhoods is provided below.

The term "$\alpha$-histogram" refers to a histogram of data that is populated with data of spatial coherence derived from a data set, typically using a plurality of local histograms. The $\alpha$-histogram is configured to amplify local (tissue) peaks relative to their peak size in the "normal" local histograms and/or full histogram. The $\alpha$-histogram is a summation of data sets from the plurality of different local histograms, the data sets having values within a target range. That is, the same mathematical operation (raise to $\alpha$) can be applied to all local histogram values, i.e., to the height of each value "x." The value "x" that is raised can have the same specific value "x" or a target range "x" of data of similar values. The range can be a narrow range, such as between about +/−1 to about +/−20 units of intensity (i.e., +/−20). The construct and application of exemplary $\alpha$-histograms will be discussed further below.

The term "partial range histograms" ("PRHs") means histograms that are populated by the sum of one or more selected local histograms in the data set in a partial intensity range that may provide a relatively large foot print in the partial intensity range and may include blocks distributed through a volume (they are not required to have a common locality). Thus, a local neighborhood may be selected to belong to a set of partial range histograms if the region has a sufficient number of voxels within a given range weight in a partial range. Although illustrated herein for discussion purposes as graphs when interrogating volume data, the histogram is not required to be generated in a graphic format and can be stored, manipulated or interrogated as a numerical data set. See, co-pending, co-assigned, U.S. patent application Ser. No. 11/137,160, the contents of which are hereby incorporated by reference as if recited in full herein. Some embodiments of the invention can employ both PRH and at least one $\alpha$-histogram and/or the peak analysis described below, such as to adapt transfer functions to render medical images. The term "peak characteristic" describes one or more parameters associated with a peak lineshape (such as, but not limited to, height, width, average width, median location, volume, or other measure) associated with a peak or peaks in a histogram.

The term "automatically" means that the operation can be substantially, and typically entirely, performed without human or manual input, and is typically programmatically directed or performed. The term "electronically" includes both wireless and wired connections between components.

The term "adaptive" means that the shape and size of the geometric perimeter lineshape (typically a trapezoid) is automatically electronically fitted to a histogram based on selected parameters and/or characteristics of the histogram. The term "transfer function" means a mathematical conversion of volume data to color and opacity values used to generate image data.

The term "tissue" means blood, cells, bone and the like. "Distinct or different tissue" or "distinct or different material" means tissue or material with dissimilar density or other structural or physically characteristic or property. For example, in medical images, different or distinct tissue or material can refer to tissue having biophysical characteristics different from other (local) tissue. Thus, a blood vessel and spongy bone may have overlapping intensity but are distinct tissue. In another example, a contrast agent can make tissue have a different density or appearance from blood or other tissue. Visualization means to view in 2-D a 3-D image of 3-D volume data (without requiring 3-D glasses or projecting spatial representations) representing features with different visual characteristics such as with differing opacity, color, texture and the like. The term "similar examination type" refers to corresponding anatomical regions or features in images having diagnostic or clinical interest in different data sets corresponding to different patients (or the same patient at a different time); examples include, but are not limited to, a coronary artery, organs, such as the liver, heart, kidneys, lungs, brain, and the like.

Some embodiments of the invention may be particularly suitable for processing MRI data (which may not have a calibrated intensity scale) wherein volume rendering may otherwise be difficult, particularly where there are different features of interest and/or different in vivo materials or tissues having overlapping intensity values.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In some embodiments, some program code may execute on local computers and some program code may execute on one or more local and/or remote server. The communication can be done in real time or near real time or off-line using a volume data set provided from the imaging modality.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the past, DVR has been carried out with the global histogram acting as the guiding tool used to find tissues of interest based on intensity scale. However, the target tissues of interest may be minor features, making their contribution almost, if not entirely, invisible in the global histogram. Generally stated, embodiments of the present invention divide a data set into local histograms. The local histograms are then mathematically raised to a power of $\alpha$ (where $\alpha>1$) before summation (and, optionally, normalization as appropriate). Then, the raised local histograms are summed to generate a resulting histogram of the summed, raised local histogram data. The value ranges with high spatial coherence (i.e., spatially concentrated) will be amplified in the resulting $\alpha$-histogram, effectively enlarging peaks corresponding to distinct materials. An automated peak detection process can be used, based on an adaptive area measure for automatic detection of tissue ranges in medical volumes. The $\alpha$-histogram is a fast and relatively simple "general purpose" histogram enhancement tool, with potential use in any application that employs and/or displays a histogram. The amplified peaks in the $\alpha$-histogram can expose peaks, peak characteristics and/or value ranges that may be obscured or suppressed in the global histogram. Embodiments of the present invention can employ data from histogram analysis for either material (tissue) detection, material (tissue) classification, or both. Thus, the histogram analysis can be employed for tissue classification without the tissue detection, tissue detection without tissue classification, or tissue detection and tissue classification together.

FIG. 1 illustrates a histogram of MR angiography, in which feature peaks (vessels) are not readily identifiable in a full histogram. The histogram is shown as a curve of intensity per number of voxels on one side and transfer function (TF) opacity on the other side. If features can be made clearly visible in a histogram, manual and automatic transfer function constructs may be improved. For this example, the value range of the vessels of interest in the full histogram is not readily apparent. In this situation, three alternative TF's are shown, and the most suitable is number 3 (the TF on the far right), although little guidance with respect to this choice is provided by the full histogram.

FIG. 2 illustrates that some histograms can have complex curve shapes. So, if a histogram is to be represented by a finite number of peaks, such as two, without landmark or fiducial information or some a priori knowledge of the data set, it can be difficult to know which peaks should be selected.

The $\alpha$-histogram is configured to incorporate spatial coherence. It is constructed as a sum of local histogram functions. Hn (N,x), counting the number of instances of a value or range of values "x" in a local neighborhood, as can be mathematically represented by Equation (1). N is the set of data values in the neighborhood, and Dx is the set of data values equaling x in the data set D. ISI is the cardinality of set S.

$$H_n(N,x) = |N \cap D_x|$$　　　　　Equation 1

The data set can be divided into spatial regions $N_1, \ldots N_k$. The α-histogram for a non-overlapping neighborhood subdivision can be mathematically represented by Equation 2.

If the region contains coherent tissues, there will be small peaks for those value ranges in the local histogram. In contrast, the majority of regions containing substantially or only noise and incoherent material will not show these distinct peaks. The analysis can amplify the local tissue peaks by raising the histogram values to the power of α>1. The α-histogram can be identified as the resulting summation of (all) the increased (mathematically raised) local histograms, which may be represented by Equation 3, in the data set D.

$$D = \bigcup_{i=1}^{k} N_i \text{ and } N_i \cap N_j = \varnothing, i \neq j \qquad \text{Equation 2}$$

In some embodiments, α can be set to various values, including ∞ (i.e., α=∞), which is a maximum operator. As shown by Equation 3, an initial normalization can optionally be carried out by raising the summed histogram values to 1/α.

$$H_\alpha(x) = \left( \sum_{i=1}^{k} H_n(N_i, x)^\alpha \right)^{1/\alpha} \qquad \text{Equation 3}$$

In particular embodiments, a second normalization may be mathematically applied so that the α-histogram has the same area as the original local and/or full histogram. The mathematical relationship represented by Equation 4 may be used to carry out the second normalization.

$$H_\alpha(x) = \frac{|D|}{\sum_x H_\alpha(x)} H_\alpha(x) \qquad \text{Equation 4}$$

Stated in another way, the α-histogram is a modulated summation of local histograms. One aspect of the α-histogram is to allow outlier values to get a higher impact by raising them to a power (i.e., where the power is two, this is squaring, where the power is three, it is cubing). In the α-histogram analysis, the sum is a desired attribute (in contrast to a Root Mean Square Error "RMSE" evaluation where averaging is applied).

In image quality technologies (particularly research), a relatively common task is to merge error measurements across space and frequency bands ("channels") into a single error measure. One traditional approach is known as *Minkowski pooling*. See Wang, et. al., *Image quality assessment: From error visibility to structural similarity*, IEEE Transactions on Image Processing 13, 4 (April, 2004). Equation 5 is a mathematical representation of a measure of error E where "l" denotes the spatial index and "m" denotes the frequency band. The individual errors are raised to a factor β before summation, and the result is normalized by taking the β root. Hence, for each value "x", the α-histogram corresponds to a Minkowski pooling of the local histograms with β=α.

$$E = \left( \sum_l \sum_m |e_{l,m}|^\beta \right)^{1/\beta} \qquad \text{Equation 5}$$

In some embodiments, the α-histogram can be generated without making assumptions about the type of the data set being analyzed. Thus, while the specification discusses data sets with a structured three-dimensional grid, the α-histogram framework can be generally applicable to other data sets characterized by histograms.

Some embodiments of the invention provide an automatic peak analysis for the α-histogram that can employ selective smoothing and can avoid overly strong smoothing and (iteratively) evaluate which peaks may be relevant in the histogram data. The peak analysis will be discussed further below.

Some embodiments of the present invention employ data derived from the α-histogram as a TF guide. The more precise TF's provided by embodiments of the present invention may be used to identify in vivo materials in an intensity scale, then apply a visual characteristic(s) of feature(s) to them (different color, opacity, density, etc.). Embodiments of the invention in the specification will be discussed with respect to providing diagnostic medical images, but may be used in other non-medical and/or non-DVR applications as well.

Turning now to FIG. 3, a visualization pipeline 10 is illustrated. As known to those of skill in the art and as shown by the broken line box 10b, the pipeline 10 can include a data capture circuit 15, a packing system and/or circuit 18, a storage circuit 20, an unpacking system and/or circuit 22 and a rendering system 25. The packing system 18 can be configured to compress and/or reformat image data. The unpacking system 22 can be configured to decompress and/or inverse format the data. The visualization pipeline 10 can be in communication with an imaging modality 50 that electronically obtains respective volume data sets of patients and can electronically transfer the data sets to the data capture circuit 15. The imaging modality 50 can be any desirable modality such as, but not limited to, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e. a common system may render images for both CT and MRI volume image data). In some embodiments, the system 10 may optionally combine image data sets generated from different imaging modalities 50 to generate a combination image for a patient.

As shown, the rendering system 25 may be in communication with a physician workstation 30 to allow user input and interactive collaboration of image rendering to give the physician the image views of the desired features in generally real time. The rendering system 25 can be configured to zoom, rotate, and otherwise translate to give the physician visualization of the patient data in numerous views, such as section, front, back, top, bottom, and perspective views. The rendering system 25 may be wholly or partially incorporated into the physician workstation 30, but may also or alternatively be partially or wholly carried out at a remote or local module, component or circuit that can communicate with a plurality of physician workstations (not shown). The visualization system can employ a computer network and may be particularly suitable for clinical data exchange/transmission over an intranet.

FIG. 4 illustrates that the rendering system 25 can include a DVR image processor system 29. The image processor system 29 can include a digital signal processor and other circuit components that allow for collaborative user input 301 as discussed above. Thus, in operation, the image processor system 29 renders the visualization of the medical image using the medical image volume data, typically on a display at the physician workstation 30.

FIG. 5 illustrates exemplary operations that can be carried out to analyze histograms and/or render images according to embodiments of the present invention. As shown, at least one α-histogram is generated. The α-histogram includes selected similar data values from local histograms associated with a target data set that is: (a) mathematically raised by a power of α; then (b) summed, whereby the α-histogram includes data with spatial coherence (block 100). The α-histogram can be used to amplify peaks related to tissue of spatial coherence relative to that shown in the full data set histogram and/or the local histogram(s) (block 102). The α-histogram can be used to electronically, automatically (or as a guide) identify one or more of material classification or material detection, of materials in the data set including materials of similar intensity.

Figure 6:
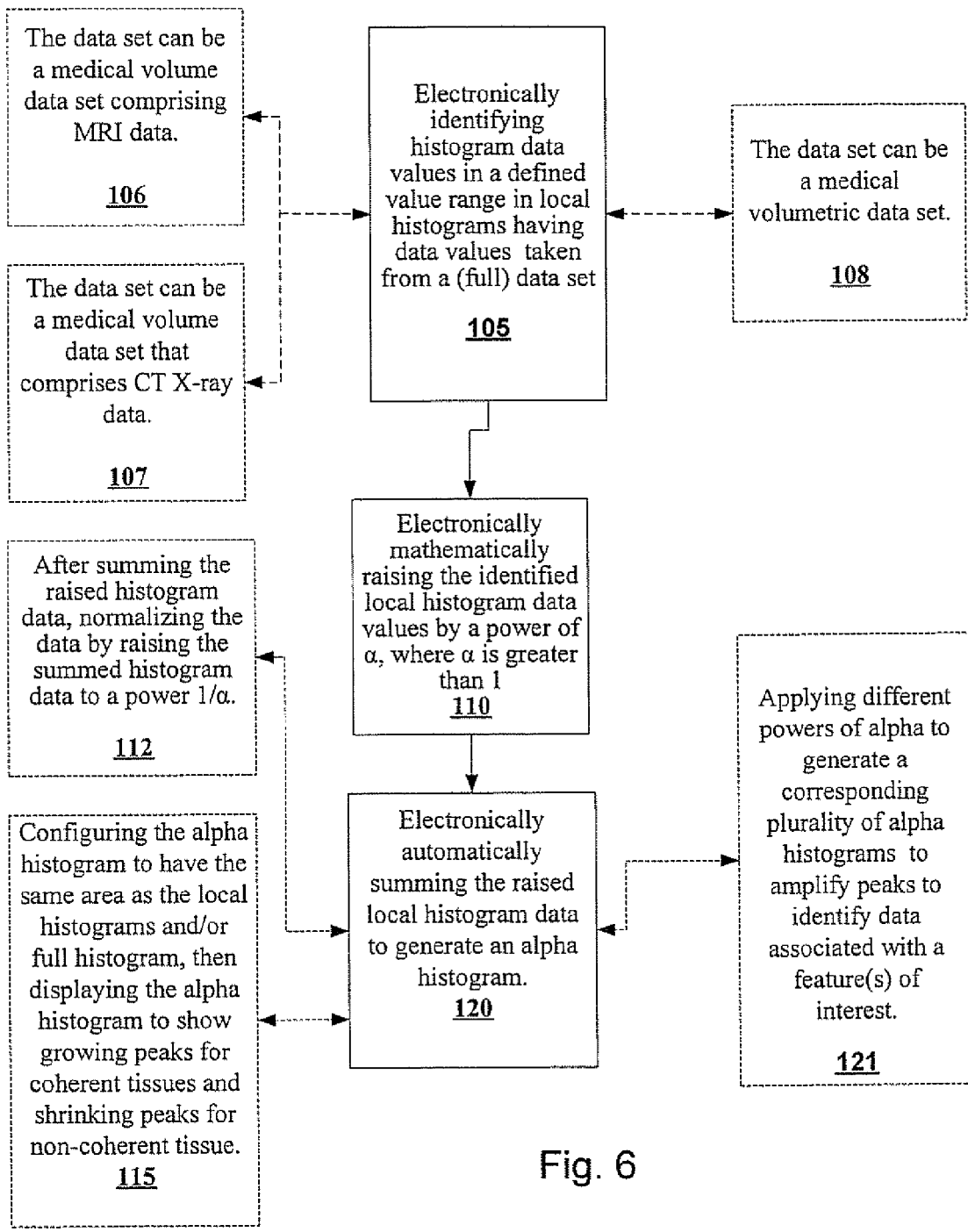
FIG. 6 is a flow chart of operations that may be used to analyze spatially coherent data in a data set according to embodiments of the present invention.

FIG. 6 illustrates another set of exemplary operations that can be used to analyze histograms according to embodiments of the present invention. Histogram data values in a defined value range of local histograms taken from a full data set can be electronically identified (block 105). The identified local histogram data can be electronically (automatically) mathematically raised by a power of α, with α being >1 (block 110). The raised local histogram data can be summed to generate an α-histogram (block 120).

In some particular embodiments, different powers of α can be applied to the local data to generate a corresponding plurality of α-histograms to amplify peaks to identify data associated with a feature of interest (block 121).

The data set can be a medical volume data set that includes MRI data (block 106). The data set can also or alternatively or additionally comprise CT X-ray data (block 107).

In some embodiments, after summing the raised histogram data, the data can be normalized by mathematically raising to a power of 1/α (block 112). The α-histogram can be configured to have the same area as the local histograms and/or the full histogram and displaying the at least one α-histogram to show growing peaks for coherent tissues and shrinking peaks for non-coherent tissue (block 115).

Figure 7:
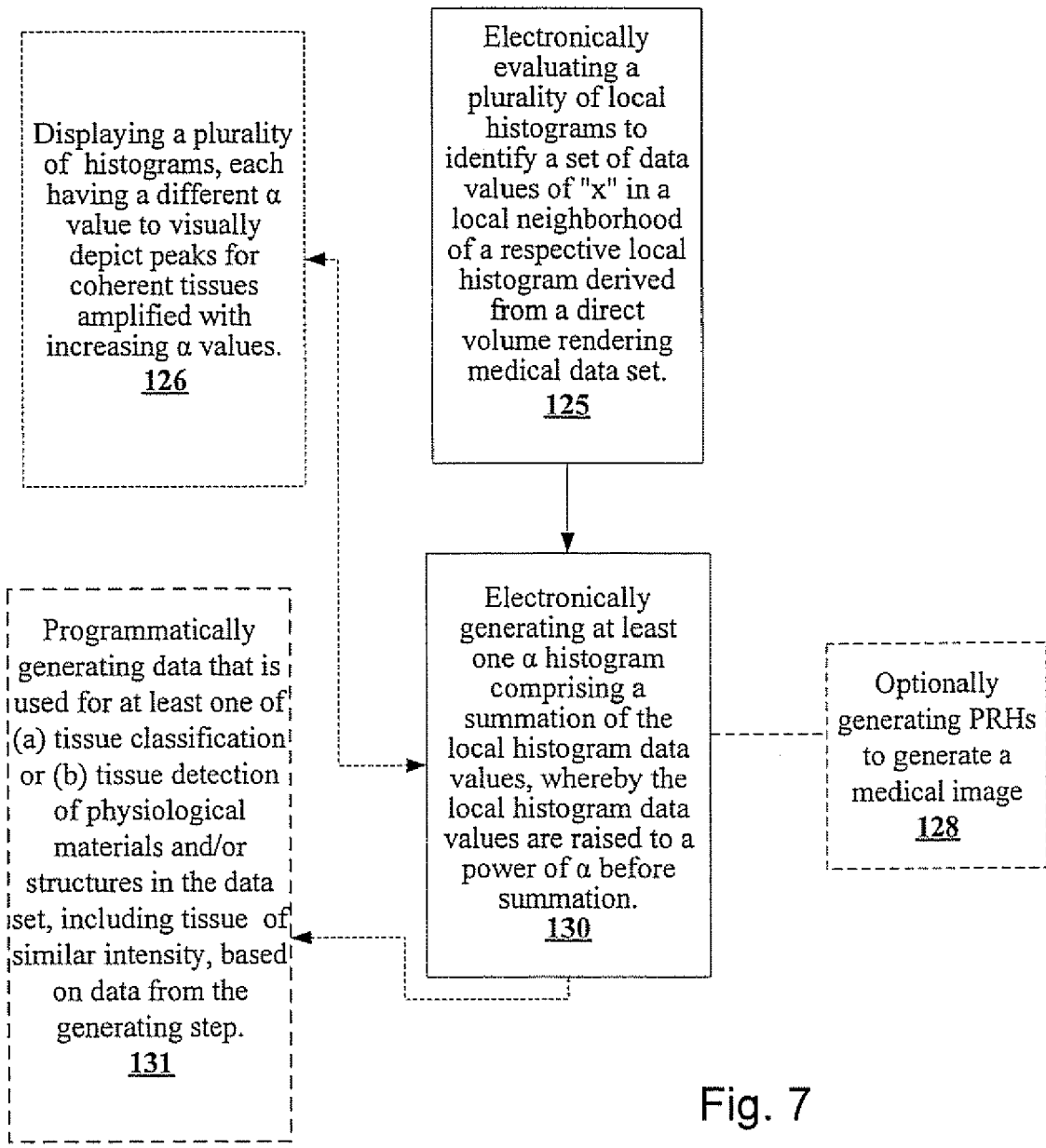
FIG. 7 is a flow chart of operations that may be used to visualize volume data from data files, such as, for example, diagnostic medical image data set files, according to embodiments of the present invention.

FIG. 7 is a flow chart of still other exemplary operations that can be used to carry out embodiments of the present invention. As shown, a plurality of local histograms can be electronically (iteratively) evaluated to identify a set of data values "x" in a local neighborhood of a respective local histogram, the local histograms derived from a directed volume rendering medical data set (block 125). At least one α-histogram can be electronically generated, the at least one α-histogram including a summation of the neighborhood histogram data values, whereby the histogram data values are raised to a power of α before summation (block 130).

Optionally, PRHs can be generated and both the PRHs and α-histogram can be used to render a medical image of the data set (block 128).

The operations can include displaying a plurality of α-histograms, each having a different power of α to visually depict peaks for coherent tissue amplified for increasing values of α (block 126). The power may occur to ∞ or a number well under ∞, particularly where results degrade or reach a plateau with values above certain levels that are well under ∞. In some embodiments, the selected α values reside between about 2-50, and may be between 3-15, including, for example, one or more of: 4, 5, 6, 7, 8, 9 and/or 10 or non-whole number values therebetween.

In some embodiments, data can be programmatically generated based on the data from the generated step (block 130) to be used for at least one of: (a) tissue classification or (b) tissue detection of physiological materials and/or structures in the data set, including tissues of similar intensity (block 131).

Figure 8:
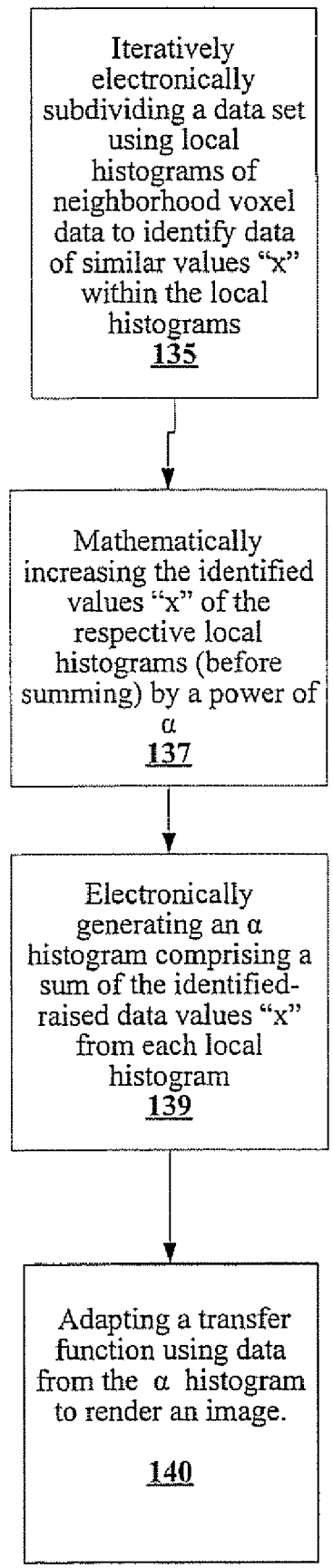
FIG. 8 is a flow chart of operations that may be used to provide a transfer function tool according to embodiments of the present invention.

FIG. 8 illustrates yet another example of operations that can be used to carry out embodiments of the invention. As shown, a target data set can be iteratively, electronically (automatically) subdivided into local histograms of neighborhood voxel data to identify data sets of similar values "x" ("similar" meaning the same value or a value within a defined range) within the local histograms (block 135). The "x" value(s) of the local histogram data sets can be mathematically increased by a power of α before summing (block 137). That is, the same mathematical operation (raise to α) can be applied to all local histogram values. i.e., to the height of each value "x". An α-histogram can be generated electronically to include a sum of the identified data sets from each local histogram (block 139). A transfer function can be adapted or selected based on data from the α-histogram to render an image (block 140).

The α-histogram framework can be configured to allow a number of modulations that can adapt the peak enhancement to the data set characteristics and the task at hand. In some embodiments, a priori information can be incorporated into the framework, in a number of different ways, which can, in some applications, increase the analytical/classification power of the evaluation.

The spatial coherence information is represented by local histograms. Any type of histogram features can be modulated through filtering. A typical task is to find tissues at a high end of an intensity scale, which can be achieved by selectively amplifying these ranges. A similar effect can be achieved by increasing a for increasing "x". If border regions are of interest, then local histograms with more than one peak can be selectively amplified.

The selection of the neighborhoods to use for the local histograms can have an impact on the resulting histogram. One straightforward solution is to divide the volume into cubical blocks, filling the volume without overlap. A feasible extension would be to use overlapping regions with a spatial weighting window that allows voxels near the region center to have a larger impact on the local histogram.

The shape of the neighborhood can also impact the analysis. If the sought-for tissues are known to have a typical shape, an anisotropic neighborhood of the same shape may be a better detector than an isotropic one. The anisotropic shape can be static but may also be automatically adapted to the local characteristics of the data. A brute-force approach is to sum amplified local histograms for anisotropic neighborhoods of "all" directions, the neighborhood coinciding with the orientation of a spatially coherent feature that would still dominate if α is sufficiently large.

In some applications, for example, as a visual guide in manual TF design, the α-histogram can be used "as-is." However, an electronic peak detection can be used to automatically adapt TFs between data sets. If the typical values of the interesting materials are known, the TF can be related to these landmarks and easily transformed for each new data set. Embodiments of the invention employ an automatic peak detection scheme for histograms. One challenge in developing a suitable peak detector is that the α-histogram can be noisy. Some smoothing can be applied, but care should be taken to only remove the unwanted irregularities without affecting "real" peaks of features or tissue of interest, which may be very subtle. Avoiding overly strong smoothing, an abundant number of peaks may remain. In such a situation, a protocol to assess, sort or identify the relevant ones can be helpful. This assessment may not be trivial, as seen in FIG. 2. In this example, the histogram includes complex peak shapes. If it is desired to represent this histogram as two different peaks, it is not readily apparent which two peaks should be used.

FIG. 9 illustrates a portion of a histogram with a peak. A peak can be defined as a histogram segment consisting of an apex surrounded by two valleys. An apex is a point with greater height than neighboring segments of the curve; the opposite is true for a valley. The importance of a peak can be related to its area. To calculate an area, a projected base line can be identified, oriented according to the peak shape. The base line can start at a highest valley with a downward slope and touch exactly one more point on the histogram curve within the peak range. The solid line in FIG. 9 illustrates the base line, with the broken lines illustrating invalid or less desirable base lines. The shaded region illustrates the peak area within the base line and peak shape of the histogram in this region. The area is calculated by summing the height difference between the base line and the histogram between the two touching points.

In some embodiments, the α-histogram peak analysis can comprise three steps. First, smoothing can be selectively applied to values corresponding to minimal peaks and creases (three directly adjacent values are valley-apex-valley or apex-valley-apex), repeated until no such cases remain. Second, the whole histogram can be subject to repeated smoothing. A stopping criterion can be given as a maximum number of remaining peaks $n_{p1}$, which can be any suitable number, but in some embodiments can be between about 10-50, and in particular embodiments can be about 20. The $n_{p1}$ value of 20 is used in some examples hereinbelow (see, e.g., FIGS. 12-14).

The first selective smoothing step reduces the need of general smoothing, in order to avoid removal of subtle peaks of interest. The smoothing operator can be a simple binomial kernel: 0.25·[1 2 1]. The third step can include listing the remaining peaks and performing a simplification, thereby reducing the peaks to a predefined number $n_{p2}$. The peak with the least area (which can be calculated as described above with respect to FIG. 9) can be removed from the list. A peak neighboring the removed one may be extended to cover the removed peak if its area would increase. If two neighboring peaks on opposing sides of the removed peak would gain from an extension, then the one having the largest peak height is selected. In summary, the number of peaks is decreased, keeping the most significant peaks as defined by peak area.

Accuracy and confidence measures can be used to evaluate the results of the peak detection. Notations $\{x-, x_o, x_+\}$ can be used to describe a true peak, where $x_0$ is the position of the peak apex and the peak width is described by $x-$ and $x_+$, which can be defined as within about the $10^{th}$ and $90^{th}$ percentiles of the peak histogram area. A detected peak, i.e., a peak approximation, is denoted $\{x^*-, x^*_o, x^*_+\}$, corresponding to the valley-apex-valley values from the peak analysis.

Accuracy is measured through the peak precision error $e_p$, defined as the absolute difference between $x^*_o$ and $x_0$, relative to the "true" peak width, as illustrated by the mathematical relationship shown in Equation 6.

$$e_p = \frac{|x^*_o - x_o|}{x_+ - x_-} \quad \text{Equation 6}$$

For confidence, the peak area is a possible measure, but there are cases when this area value may be misleading. An example is a wide, flat peak that would have a large area but still provide a very uncertain prediction. Instead, peak confidence, $c_p$, can be defined to be the relative height difference of the peak apex H ($x^*_o$) and the highest of the two valleys $H(x^*_-)$ and $H(x^*_+)$, where H(x) denotes the histogram function, as shown, for example in Equation 7.

$$c_p = \frac{H(x^*_o) - \max(H(x^*_-), H(x^*_+))}{H(x^*_o)} \quad \text{Equation 7}$$

Experimental results using the α-histogram and peak detection processes are described under the title "EXAMPLES" below.

As noted above, in some particular embodiments, combinations of the α-histogram and/or peak analysis with PRHs can be used to provide an automatic analysis of the global histogram using iterative subdivision of the histogram data (e.g., the volume data set) to detect all peaks corresponding to different materials using one or both of the PRHs (partial range histograms) and/or α-histogram. The automated PRHs analysis steps may include:

1. Find the highest peak of the main histogram.
2. Fit a Gaussian to the main histogram using data associated with the peak.
3. Create a PRH for a mid-portion of the Gaussian.
4. Remove the PRH blocks from the main histogram.
5. Repeat steps 1-4 until the main histogram is empty.
6. Merge PRH's with peak characteristics (or peaks) that are similar.

Thus, in some embodiments, the PRHs analysis can start with volume data associated with the global or main histogram range. Alternatively, the PRHs can be generated using the α-histogram, rather than the original data set histogram. In either application, the highest peak is identified and a Gaussian curve is fitted to its shape. The Gaussian curve may be described by the midpoint μ, height ĥ, and deviation σ. The fitting process reduces the accumulated height difference between the histogram and the medial portion of the Gaussian curve. The error summation range is μ±ασ. In some embodiments, α=1. This small range may be selected because typically only the tip of the histogram peak is visible.

The next step is to create a PRH for a desired range. For example, the range can be selected as: μ±σ. This range choice yields many narrow, accurate peaks. Because the merging step follows, an abundance of peaks is not a problem. The blocks of the first PRH can be stored and/or removed from the main histogram. This exposes a new peak in the "main" histogram and the analysis algorithm repeats. If a PRH is empty, the C value can be lowered and step 3 can be performed again. In this structured manner, all blocks can become part of a PRH. Then, PRHs having similar peak characteristics (e.g., similar peaks) can be merged.

To describe the PRH peak characteristics, a Gaussian curve can be fitted to each PRH with the same method as described above. For the PRH Gaussian curve, the error summation may be adjusted. For example, α=2 may be employed because the entire peak is typically exposed. PRHs can be merged or joined if they have similar peak characteristic or peak deviation. In some embodiments, "similar deviation" can be defined as when $\sigma_{max}/\sigma_{min} \leq 4$, while their means are close. Their means may be considered close when $\mu_{max} - \mu_{min} \leq \sigma_{min}*\max(1.0, 2.0-\sigma_{min}/40.0)$. By defining the similar deviation in this manner, the second criterion is less strict for narrow peaks. For merged PRH's, a new Gaussian curve can be fitted to allow for multiple mergers. As used herein, the term PRH also refers to the merged PRHs.

It is noted that there are many suitable ways to construct a transfer function as known to those of skill in the art. In some examples herein, trapezoids are used to generate the transfer function that provides a graduated image intensity scale. The trapezoidal transfer functions may be particularly suitable for embodiments generating interactive tissue exploration tools for a physician as will be discussed further below. However, in some embodiments, particularly with respect to tissue detection, local histogram analysis can be used to generate (or adapt, see below) transfer functions of other types.

In some embodiments, the tissue detection can be seen as a calibration tool, independent of a transfer function concept, and can be compared to other calibration/standardization efforts. See e.g., *On standardizing the MR Image Intensity Scale*, Nyul & Udupa, Magnetic Resonance in Medicine, 1999 (which proposes a method based on global histogram comparisons). An example of another type of transfer function is when the color and opacity mapping for an intensity value are decoupled and generate continuous functions of opacity versus intensity, with colors varying in a general continuum from left to right across the graph (white, yellow, dark yellow, orange, red, pink, purple, blue, etc. with the colors typically intensifying from right to left within color segments).

In particular embodiments, the tissue detection methods of the present invention can be used to adapt, improve, calibrate, evaluate and/or extend existing manual transfer functions, rather than creating new ones "from scratch". In operation, manual or a priori transfer functions can be created or established with a minor training set (such as between about 3-10 cases of exemplary volume rendering data sets of a target region with similar materials and configurations of features, such as images of the same target region of a body). The automated tissue detection described herein can be applied on the training sets, and a relation between the detected tissues using the automated tissue detection methods and the manual and/or a priori transfer function can be derived. Then, the tissue detection can be applied to other, unknown data sets of the same type. Knowing the relation, an appropriate transfer function (one with increased reliability) can be established for each individual anatomical feature of interest.

In some cases, the neighborhood histogram data can be sufficient to generate the rendered image in that different surroundings of equal-intensity voxels can provide diversifying information. That is, local histogram analysis can be used to classify voxels in a type of morphological filtering and/or fuzzy classification. In some embodiments, a classification model can be used to define a second attribute for a 2-D TF, as will be discussed further below.

In some embodiments, adaptive trapezoids can allow an efficient workflow when manually defining or modifying a TF "on the fly" using the following operations, which allow for some physician input:
1. Apply automatic tissue detection.
2. Activate an adaptive trapezoid (during an initial stage of the analysis, the TF can consist of this single trapezoid).
3. Browse the detected PRHs until the adapted trapezoid highlights a tissue or feature of interest.
4. Fixate the trapezoid at this position, making it static and temporarily disconnected from the TF.
5. Perform steps 2-4 until all tissues of interest are found.
6. View the full TF, i.e. activate all defined trapezoids, and adjust the color and opacity for each trapezoid as desired.

In addition, adaptive trapezoids can be used as a semi-automatic or manual electronic tissue exploration tool for the user. In so doing, step 1 above can be omitted and step 3 can be replaced by manually sliding the center of a partial range across the intensity scale.

Some embodiments of the present invention can be configured to separate overlapping tissue ranges and provide for a truer visualization in the rendered image. That is, in the past, a common problem in medical DVR is in rendering tissues with overlapping intensity ranges. A typical example is CT angiographies, where vessels having a contrast agent have the same intensity as spongy bone. A conventional TF based only on intensity has difficulty in generating a rendering that separates the two tissues. In contrast, using the local histogram analysis can extend the DVR capabilities in this respect. Such an application of neighborhood operators to classify voxels can be considered to be a type of morphological filtering. See generally Maragos et al., *Morphological systems for multi-dimensional signal processing*, Proceedings of the IEEE 78, 4 (1990), 690-710.

In some embodiments, when the intensity data alone does not sufficiently separate materials, neighborhood histogram analysis data can be used to do so. This is because different surroundings of equal-intensity voxels can provide diversifying (classifying) information. One analysis type that can be used to classify the distinct tissue can be based on range weights as described above with respect to PRH and/or the $\alpha$-histogram peak detection.

Figure 16:
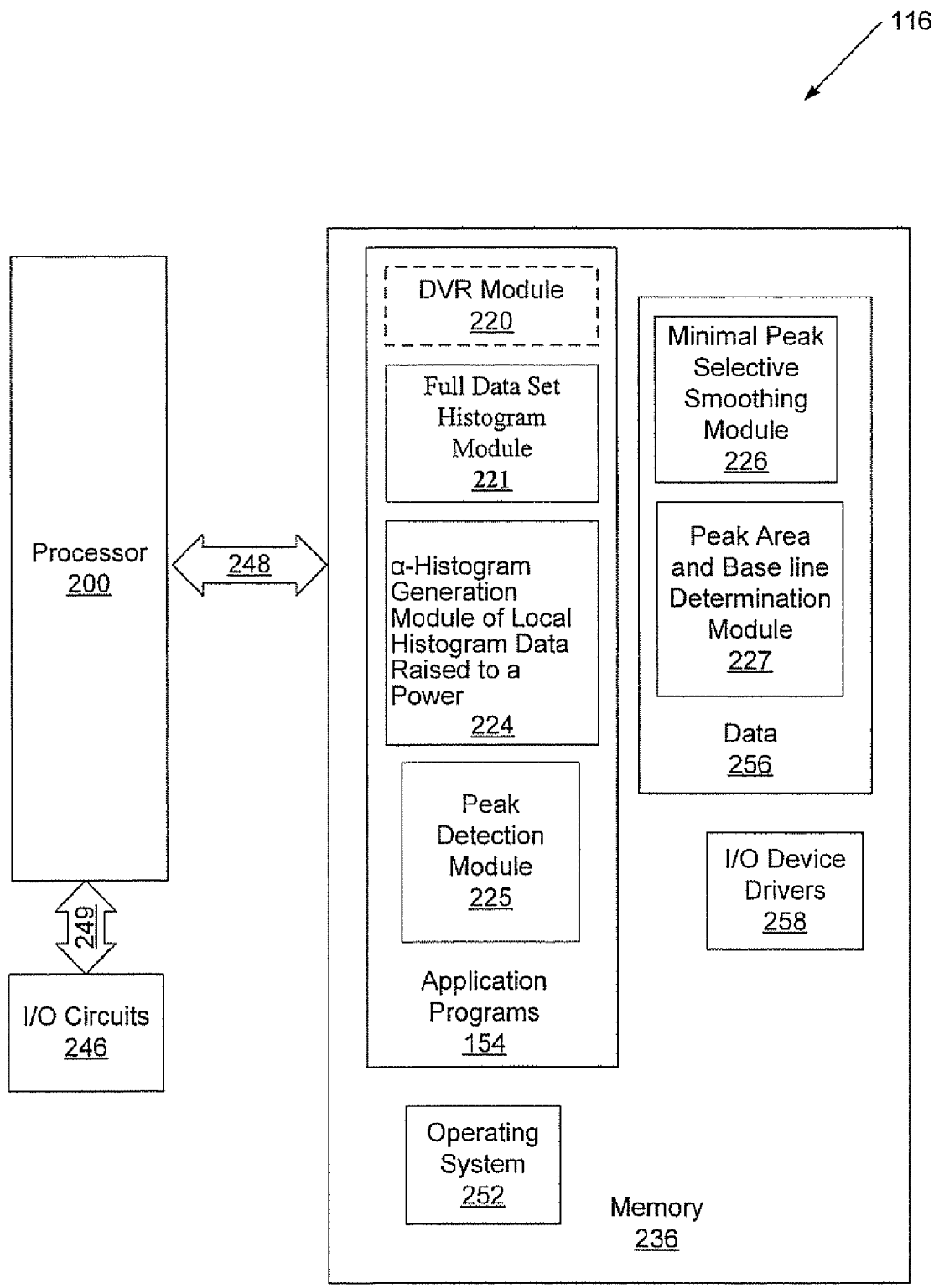
FIG. 16 is a schematic illustration of a data processing system according to embodiments of the present invention.

As illustrated in FIG. 16, embodiments of the invention may be configured as a data processing system 116, which can be used to carry out or direct operations of the rendering, and can include a processor circuit 200, a memory 236 and input/output circuits 246. The data processing system may be incorporated in, for example, one or more of a personal computer, workstation, server, router or the like. The processor 200 communicates with the memory 236 via an address/data bus 248 and communicates with the input/output circuits 246 via an address/data bus 249. The input/output circuits 246 can be used to transfer information between the memory (memory and/or storage media) 236 and another computer system or a network using, for example, an Internet protocol (IP) connection. These components may be conventional components such as those used in many conventional data processing systems, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk. In some embodiments of the present invention, the memory 236 may be a content addressable memory (CAM).

As further illustrated in FIG. 16, the memory (and/or storage media) 236 may include several categories of software and data used in the data processing system: an operating system 252; application programs 254; input/output device drivers 258; and data 256. As will be appreciated by those of skill in the art, the operating system 252 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application programs 254 to communicate with devices such as the input/output circuits 246 and certain memory 236 components. The application programs 254 are illustrative of the programs that implement the various features of the circuits and modules according to some embodiments of the present invention. Finally, the data 256 represents the static and dynamic data used by the application programs 254 the operating system 252 the input/output device drivers 258 and other software programs that may reside in the memory 236.

The data 256 may include a probability classification model 226 that provides an attribute for the transfer function module 224. As further illustrated in FIG. 16, according to some embodiments of the present invention application programs 254 include one or more of: a DVR Module 220, a full data set Histogram Module 221, an (automatic or semi-automatic) α-Histogram Generation Module of local histogram data raised to a power 224, and may include a Peak Detection Module 225 (to identify relevant peaks and/or calculate estimated baselines for peak areas). The application programs 220, 221, 224, 225 may be located in a local server (or processor) and/or database or a remote server (or processor) and/or database, or combinations of local and remote databases and/or servers.

While the present invention is illustrated with reference to the application programs 220, 221, 224, 225 in FIG. 16, as will be appreciated by those of skill in the art, other configurations fall within the scope of the present invention. For example, rather than being application programs 254 these circuits and modules may also be incorporated into the operating system 252 or other such logical division of the data processing system. Furthermore, while the application programs 220, 221, 224, 225 are illustrated in a single data processing system, as will be appreciated by those of skill in the art, such functionality may be distributed across one or more data processing systems. Thus, the present invention should not be construed as limited to the configurations illustrated in FIG. 16, but may be provided by other arrangements and/or divisions of functions between data processing systems. For example, although FIG. 16 is illustrated as having various circuits and modules, one or more of these circuits or modules may be combined or separated without departing from the scope of the present invention.

The present invention is explained in greater detail in the following non-limiting Examples.

EXAMPLES

The test results are divided into two parts. First, synthetic data sets are used to explore the properties of the α-histogram and its variations. These experiences are then applied to a clinical TF adaptation problem, in which tissue detection is a key component. The results concern a standard α-histogram based on $8^3$ blocks, unless stated otherwise.

Synthetic Data Sets

Figure 10A:
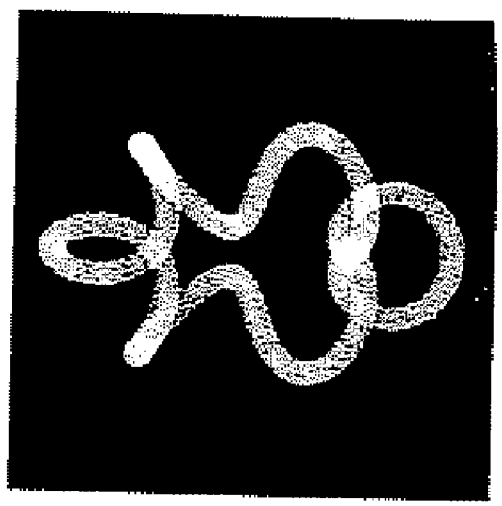
FIG. 10A is a digital image of a spiral structure used as an imaging phantom of a vessel.
Figure 10B:
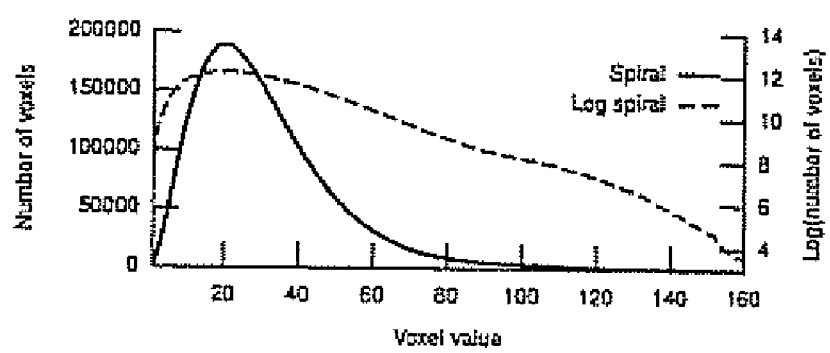
FIG. 10B is a histogram of image data of the spiral structure shown in FIG. 10A, plotting the number of voxels (left side vertical axis) and Log number of voxels (right hand vertical axis) versus voxel value. The spiral graph is associated with the solid line and the log graph is associated with the dashed line. The background and the spiral have Gamma and Gaussian distributions, respectively.

Tests have been performed on two synthetic data sets with controllable characteristics. As shown in FIGS. 10A and 10J, the first data set is a tube spiraling around a torus, intended to imitate a vessel, designed not to coincide with a Cartesian block structure. Since a block subdivision is performed in the standard α-histogram, the spiral shape is designed not to be aligned with any Cartesian grid. The radius, ρ, sets the width of the "vessel". The distributions of voxel values have been chosen to mimic real angiography data sets. The vessel has a Gaussian distribution ($\mu=100$, $\sigma=20$). The background has a Gamma distribution ($\mu=30$, $\alpha=10\sqrt{3}$) resulting in a single peak with no negative values but with large spread to high positive values. The spiral peak at value 100 is not visible, even using a logarithmic scale.

Figure 11A:
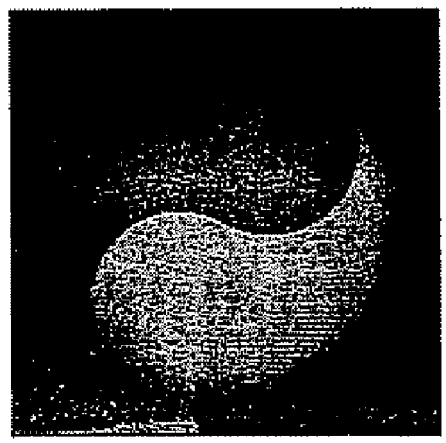
FIG. 11A is a digital image of a synthetic data set chosen to imitate two closely spaced organs.
Figure 11B:
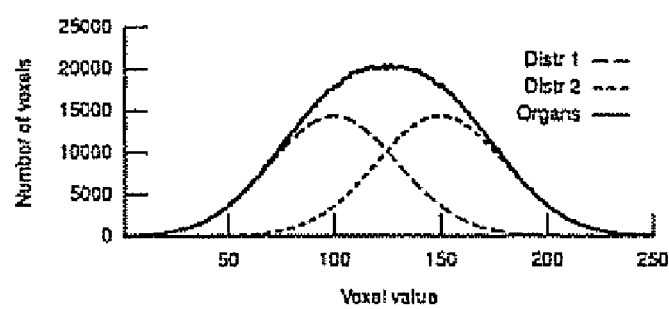
FIG. 11B is a histogram of image data of the dual organ structure shown in FIG. 11A, of number of voxels versus voxel value. The background is zero, and the "organs" have separate Gaussian distributions (Dist1, Dist2). The curve for the two organs together is the tallest curve. The Dist 1 curve corresponds to the dark organ (center about 75) and the Dist 2 curve corresponds to the lighter organ (center about 150).

FIGS. 11A and 11B illustrate the second synthetic data set, which imitates two organs. The curved "yin-yang" shape shown in FIG. 11A is selected, as before, to be independent of the Cartesian blocking. The background has value zero and the two "organs" both have separate Gaussian distributions ($\sigma=30$): the first is fixed at $\mu_{y1}=100$, whereas $\mu_{y2}$ can be varied. Both of the synthetic data sets have $192^3$ voxels, reconstructed for each test by assigning random voxel values according to the given distributions. Presented measures are averages over 10 trials, whereas histograms are from a single test. For these simulations, a single measure to describe the quality of α-histograms was used. The cp, (Peak confidence) measure was used with the added restraint that it is set to zero for peak detection failures (if the detected peak apex was offset more than half a standard deviation from the true peak, or a valley being directly adjacent to the apex).

A first round of tests explored the effect of a on the peak detection ($n_{p2}=2$). As seen in FIGS. 12A and 128, the spiral peak associated with the phantom shown in FIG. 10A becomes more apparent as higher α is applied. The disadvantage of a higher α is the amplified noise. This noise can make the peak detection confidence drop for high α. FIG. 12A illustrates that the higher α, the higher are both peak amplification and noise, shown with three different alpha values (ρ=6). FIG. 12B illustrates "vessel" peak detection; with increasing Ca, the detection improves, but the noise reduces the confidence at very high α.

A similar experiment (FIGS. 13A and 13B) was carried out on the synthetic organs shown in FIG. 11A. Peak detection confidence increases with higher α, but the gain is most pronounced for difficult detection cases. FIG. 13A shows that the higher α is, the higher are both the peak amplification and the noise ($\mu_{y2}=150$). FIG. 13B illustrates a peak detection for the high intensity "organ" in FIG. 11A. Detection confidence generally increases with α, but relatively quickly reaches a plateau for simpler detections.

Apart from allowing the use of the peak detection analysis, the α-histogram can enhance the visual appearance. In the spiral data set, as in many real data sets, the height of the background peak is orders of magnitude larger than the others, hindering a good overall view. Using, for example, logarithmic scale can help, but the α-histogram has the effect of both evening out the peak heights and promoting spatial coherence.

Figure 14A:
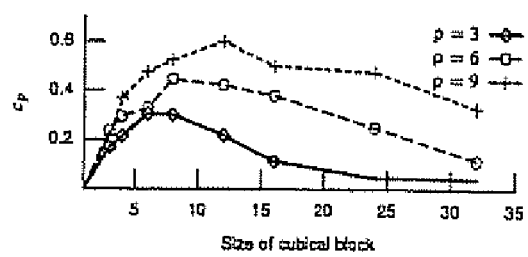
FIG. 14A is a graph of peak detection confidence versus size of cubicle block used to define local histograms for spiral data sets with α=10.

One selectable parameter in the block-based α-histogram is the block size. In FIG. 14A different block sizes are applied to spirals (FIG. 10A) of different widths. In this analysis, $\alpha=10$. Two conclusions can be drawn from the results: the block size may be at about $6^3$ or greater for most image applications in order to obtain good effect from the spatial coherence; and features of the same scale as the block size may be favored by the α-histogram.

Figure 14B:
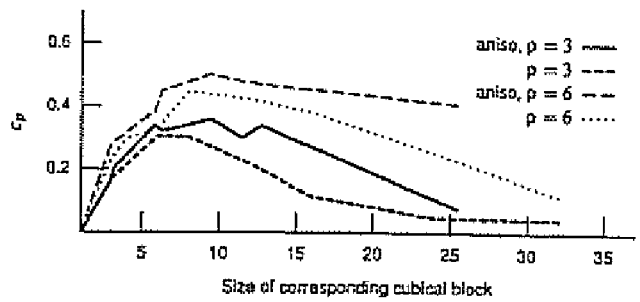
FIG. 14B is a graph of peak detection confidence verses size of blocks comparing anisotropic blocks to cubical blocks for stretched versions of the spiral data set used in FIG. 14A (α=10).

If there is a priori information that the feature of interest, such as tissue, has larger extent in a certain dimension, then this can be exploited by using non-cubical blocks. This has been tested on a version of the spiral data set where the spiral extends four times further in the z-direction than in x and y. Results from anisotropic blocks being 3-4 times longer in the z-direction were compared with those from cubical blocks. In this analysis. α=10. The results are illustrated in FIG. 14B and show that there is some advantage to adapting the block shape to the tissue characteristics, but the effect is not dramatic.

Clinical Data Sets

The α-histogram has been applied to TF adaptation for a number of problematic clinical data sets. Twenty (20) MR angiographies of Abdominal Aortic Aneurysm (AAA) have been tested and captured with several different protocols resulting in highly varying data set characteristics. One interesting tissue is the contract agent-filled vessels, for which the typical intensity value varies between 182 and 1393 across the data sets. AAA images are typically used to prepare for surgical procedures where stents replace parts of the aorta. It can be important for the success of the operation to know the exact aorta diameter. For example, an error of over 2 mm (typically about 2 pixels) is usually considered clinically unacceptable. Inadequate TF parameters can cause diameter measurement errors well above this limit. See Persson et al., *Volume rendering compared with maximum intensity projection for magnetic resonance angiography measurements of the abdominal aorta*, Acta Radiologica 45 (2004), 453-459.

It can be difficult to use the rendered images for a detailed quantitative evaluation of the TF adaptation; the gold standard available for these images is not precise enough. Instead, the detected peak can be compared directly to the histogram of a manual segmentation of the vessels. As one of the alternative methods (PRH) has been successfully clinically evaluated. See, Persson et al., *Standardized volume rendering for MR angiography measurements in the abdominal aorta*, (to appear in Acta Radiologica). As such, it is believed that its pea detection results set an acceptable benchmark for the comparisons of the α-histogram. The "ground truth" segmentations were validated by an experienced radiologist.

As a first reference, a static peak apex predictor, defined as the value corresponding to 98.1% of the full histogram area, is used. This value is used since the true apex in average corresponds to this percentile in these data sets. Intensity value 0 is discarded, as it is often orders of magnitude more frequent than the other values. Both the original histogram and a number of α-histograms have been evaluated using the peak detection methodology described above. As the appropriate choice of $n_{p2}$ may vary, four different simplifications were applied to the data, with $n_{p2}$=1, . . . , 4, respectively. Among this total of 10 peak definitions, those having the apex within a valid range were considered and the one with highest confidence was selected. If no peak was found within the range, the one closest to the range was used. The valid range was defined as the points corresponding to 96.5% and 99.2% of the histogram area, which is the range of the true apices in the data sets analyzed.

In addition, the Partial Range Histogram (PRH) method was applied for comparison to techniques. See co-pending U.S. patent application Ser. No. 11/137,160, incorporated by reference hereinabove, and Lundstrom et al., *Extending and simplifying Transfer Function design in medical Volume Rendering using local histograms*, Proceedings IEEE/EuroGraphics Symposium on Visualization (2005), pp. 263-270, hereby incorporated by reference as if recited in full herein. Generally stated, a primary goal of the PRH method is to create a separate histogram for each tissue and a main parameter is the range weight limit ε. The resulting number of PHR peaks, $n_{PRH}$, is typically between 5 and 10 and can be simplified further. In these data sets the vessel peak is known to be at the top of the intensity scale. A number of possible top peaks can be created by merging 1, . . . , $n_{PRH}$-1 of the topmost peaks. The peak selection then follows the rules connected to the valid range described above.

The overall results of the peak detection are given in Table 1. Accuracy is represented by precision error, both mean ($\bar{e}_p$) and median ($\tilde{e}_p$), and the robustness by the mean peak confidence ($\bar{c}_p$). Compared to the percentile reference, peak detection on the original histogram has lower error for a majority of cases, but the average error remains high.

TABLE 1

Peak detection results for 20 MR AAA angiographies. The block size is $8^3$ for both α-histograms and PRHs.

|  |  | $\bar{e}_p$ | $\tilde{e}_p$ | $\bar{c}_p$ |
|---|---|---|---|---|
| Percentile |  | 0.21 | 0.17 | — |
| Original histo |  | 0.23 | 0.09 | 0.04 |
| α-histo | α = 4 | 0.11 | 0.02 | 0.19 |
|  | α = 10 | 0.09 | 0.03 | 0.21 |
|  | α = ∞ | 0.12 | 0.04 | 0.21 |
| PRH | ε = 0.6 | 0.07 | 0.01 | (0.76) |
|  | ε = 0.7 | 0.14 | 0.08 | (0.63) |
|  | ε = 0.8 | 0.12 | 0.03 | (0.73) |

Figures 15A, 15B:
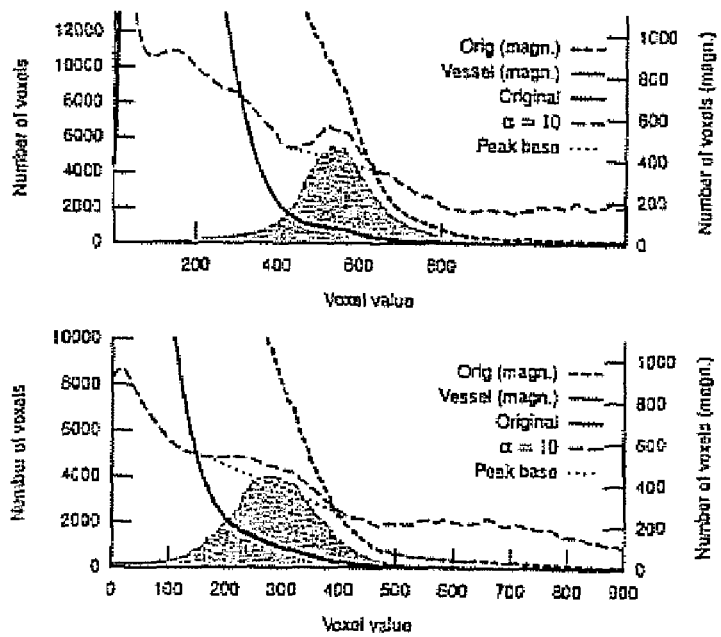
FIGS. 15A and 15B are α-histograms of number of voxels versus voxel value for two MR angiography data sets The right hand scale is number of voxels magnified. In these histograms, smoothing has been applied, and α=10 was used.

The α-histograms provide clear improvement on peak detection accuracy as well as robustness. The results are consistent across all three values of α. The resulting α-histograms for two difficult MR angiography data set cases are presented in FIGS. 15A and 15B, and demonstrate that even if the peak apex detection is somewhat imprecise, the α-histogram can still be of value in emphasizing the value range of a tissue. In these examples, α=10 and smoothing has been applied. FIG. 15A illustrates that using the α-histogram, the peak is found with high accuracy and confidence ($e_p$=0.03, $c_p$=0.01). FIG. 15B shows that, even though the detected peak apex is not quite accurate, the peak range is appropriately detected ($e_p$=0.30, $c_p$=0.01).

Figure 17A:
FIGS. 17A and 17B are digital images of MR angiographies using a TF based on the average of the 20 tested data sets.
Figure 18A:
FIGS. 18A and 18B are digital images of the MR angiographies, where the TF was adapted for each data set according to the peak detected in the α-histogram (α=10).
Figure 17B:
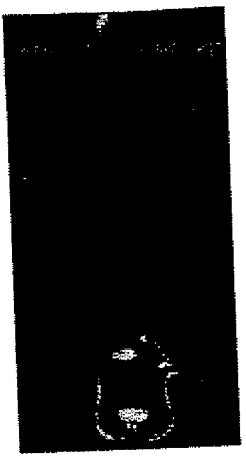
Figure 18B:
Figure 18C:
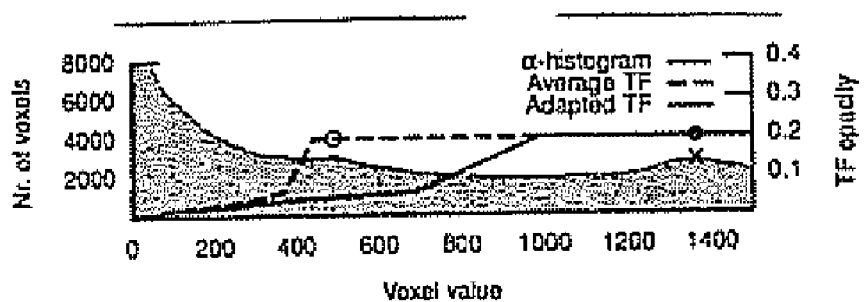
FIGS. 18C and 18D are graphs of TF opacity (right side) and number of voxels (left side) versus voxel value illustrating the α-histogram as the shaded area, the average TF as the broken line curve, and the adapted TF as the solid line.
Figure 18D:
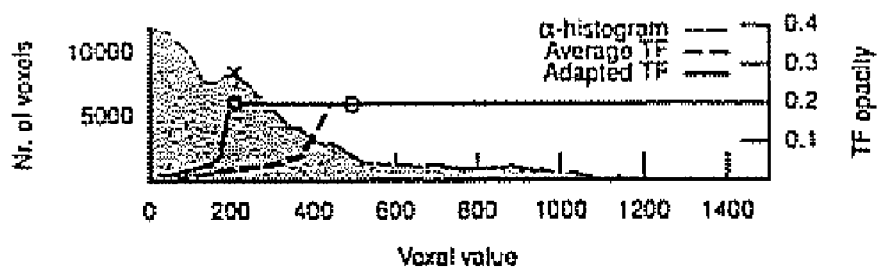

Some examples of TF design based on averaged (FIGS. 17A and 17B) and α-histogram adaptations (FIGS. 18A and 18B). In these figures, the affect of TF adaptation for MR angiography images is illustrated. FIGS. 17A and 17B show images using a TF based on the average of the 20 tested data sets. FIG. 17A illustrates that the aorta width is exaggerated and FIG. 17B illustrates that the aorta is barely visible. FIGS. 18A and 18B show images of the data sets shown in FIGS. 17A and 17B, respectively, but using a TF that was adapted for each data set according to the peak detected in the α-histogram (α=10). In both FIGS. 18A and 18B, the width of the aorta is correctly shown. FIG. 18C (associated with FIGS. 17A, 18A) and 18D (associated with FIGS. 17B, 18B) are graphs of TF opacity (right side) and number of voxels (left side) versus voxel value illustrating the α-histogram as the shaded area, the average TF as the broken line curve, and the adapted TF as the solid line. In these graphs, the "cross" denotes the peak and the "circle" denotes the TF reference point.

Referring again to Table 1, the peak detection based on PRHs has the same level of quality as the α-histograms. A potential drawback, which may be alleviated in future application, may be the sensitivity of the choice of ε; in a recent analysis, the results differ significantly between three variants. It is currently believed that a potential advantage of using PRHs is that they separate the tissue peak from the global histogram, e.g., causing extremely high confidence values that may not be fairly compared to the other methods.

The sizes of the clinical data sets were 6-32 MB and an α-histogram with α=10 and block size $8^3$ was calculated in 0.4-2.2s on a 1.8 GHz Pentium M laptop. The PRH method had similar performance: 0.4-2.9s. These times are quite acceptable, particularly since the methods are typically to be applied in a pre-processing step.

In summary, the α-histogram is a novel tool that can evaluate histogram data and may be particularly suitable to facilitate TF design in DVR. The α-histogram introduces an automatic enhancement of spatially coherent value ranges, hence emphasizing distinct materials in the data set. One efficient variant is based on non-overlapping cubical block neighborhoods. Merely two parameters then exist, α and the block size, and the enhancement is not typically sensitive to the choice of these parameters.

The typical intensity values for vessels in MR angiographies have been detected automatically with high accuracy and confidence using the α-histogram. The enhancement can be used both to reveal invisible histogram peaks and also to increase the accuracy and confidence of distinguishable peaks. The α-histogram is appropriate as a general-purpose histogram enhancement, particularly useful for automatic TF adaptation between data sets. The framework can be used for many complex rendering tasks.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method of evaluating data, comprising:
   identifying data of a defined value or in a defined value range in a data set;
   mathematically raising the identified data values by a power of α, where α is greater than 1; and
   automatically summing the raised data values to generate an α-histogram that amplifies spatially coherent histogram data values,
   each of the identifying, raising and summing steps being performed electronically.

2. A method according to claim 1, wherein the identifying data values comprises identifying a data value "x" in local histograms, wherein the mathematically raising the identified data values comprises mathematically raising x by the power of α for each local histogram, and wherein the automatically summing comprises summing the raised x local histogram values to generate the α-histogram.

3. A method according to claim 2, further comprising electronically normalizing the summation of the raised histogram values by a power of 1/α.

4. A method according to claim 3, further comprising mathematically adjusting the α-histogram to have an area that is the same as that of the local histograms to normalize the α-histogram.

5. A method according to claim 4, further comprising electronically displaying the α-histogram with a scale that is substantially the same as that of the full histogram and/or local histograms to visually illustrate peaks of coherent tissues with increased height and to visually illustrate peaks with reduced height that are associated with lesser clinical relevance.

6. A method according to claim 4, further comprising electronically generating a plurality of α-histograms for different α values, then displaying the plurality of α-histograms to illustrate growing peaks for coherent tissues with increasing α values.

7. A method according to claim 1, wherein the αhistogram is generated independent of any characterization of the type of data set forming the full histogram.

8. A method according to claim 2, further comprising using a priori information about a primary data set to define at least one neighborhood shape used to form the local histograms and/or to select neighborhoods to form the local histograms to thereby guide evaluation of the full histogram data set.

9. A method according to claim 2, further comprising using cubicle blocks of data to generate the local histograms.

10. A method according to claim 1, further comprising using the αhistogram as a visual guide in manual transfer function design.

11. A method according to claim 1, further comprising automatically adapting transfer functions between data sets using the αhistogram.

12. A method according to claim 1, further comprising selectively smoothing values corresponding to minimal peaks and creases to iteratively automatically detect and identify clinically relevant distinct peaks in the α-histogram.

13. A method according to claim 1, further comprising electronically generating a direct volume rendering medical diagnostic image of a patient using data from the α-histogram.

14. A method according to claim 1, wherein the data set is a medical volumetric data set.

15. A computer program product configured to carry out the method of claim 1.

16. A method according to claim 1, further comprising evaluating medical image data sets using data from the α-histogram the amplify peaks to identify data associated with a feature of interest.

17. A method of evaluating data associated with medical volumetric data sets, comprising:
   electronically evaluating a plurality of local histograms to identify a set of data having a defined voxel value of "x" in the respective local histograms, the local histograms derived from a medical volumetric data set; then
   electronically generating at least one α-histogram comprising a summation of the identified local histogram data values, whereby the respective identified local histogram data is raised to a power of α before summation; and
   programmatically evaluating medical volumetric image data sets using the electronically generated at least one α-histogram.

18. A method according to claim 17, further comprising normalizing the summed α-histogram data to a power 1/α.

19. A method according to claim 18, further comprising:
   modifying the α-histogram to have the same area as that of a full histogram; and displaying the α-histogram illustrating peaks therein.

20. A method according to claim 19, wherein the displaying comprises displaying a plurality of α-histograms, each having a different α value to visually depict peaks for coherent tissues amplified with increasing α values.

21. A method according to claim 17, further comprising programmatically performing at least one of (a) classifying tissue, (b) detecting tissue of physiological materials including tissue of similar intensity or (c) detecting structures in the data set, based on the evaluating step.

22. A method according to claim 17, wherein the medical volumetric data set comprises Magnetic Resonance Imaging (MRI) data.

23. A method according to claim 17, wherein the medical volumetric data set comprises Computed Tomography (CT) data.

24. A method according to claim 17, further comprising accepting user input to generate a transfer function based on data from the αhistogram to thereby allow generally real-time interactive exploration of a rendered image.

25. A method according to claim 17, further comprising selectively smoothing values corresponding to minimal peaks and creases in the αhistogram to remove the minimal peaks and creases from a displayed αhistogram to thereby decrease an overall number of peaks in the αhistogram while retaining clinically significant peaks.

26. A method according to claim 17, wherein the αhistogram has an associated curve with a plurality of peaks, the method further comprising automatically electronically identifying a base line associated with a peak in the a histogram to evaluate peak characteristics, wherein the base line has a slope that extends downwardly from a highest valley region of the respective peak to a lower point on the histogram curve within the peak range.

27. A method according to claim 17, wherein the medical volumetric data set comprises a volume rendering data set, and wherein the method further comprises electronically rendering a direct volume rendering image from the medical data set using data from the at least one αhistogram.

28. A method according to claim 27, wherein the medical volumetric data set comprises MRI data, and wherein the method further comprises adapting a transfer function to allow relatively precise diameter measurements of at least one target feature using data from the α histogram.

29. A method according to claim 17, wherein α is greater than or equal to about 4.

30. A method for visualizing images of volume data sets, comprising:
iteratively electronically subdividing a data set using local histograms of neighborhood voxel data to identify data sets of similar values within the local histograms;
mathematically raising by a power of α the identified data set values of the respective local histograms; then
electronically generating an α histogram comprising a sum of the raised identified data sets from each local histogram; and
adapting a transfer function using data from the α histogram to render an image.

31. A method according to claim 30, wherein the volume data sets are medical volumetric data sets, and wherein the rendered image is a medical image.

32. A system for generating DVR medical images, comprising:
a volume rendering medical image processor system configured to generate a diagnostic medical image of a target region of a patient, the system configured to electronically analyze a volume rendering data set using at least one histogram that mathematically increases selected data values to amplify local peaks associated with spatially coherent data, the peaks generated from data derived from a plurality of local histograms of the volume rendering data set.

33. A system according to claim 32, wherein the histogram is an α-histogram that mathematically raises the selected data values by a power of α, wherein the α histogram has an associated curve with a plurality of peaks, and wherein the system is configured to automatically electronically identify a projected base line associated with a peak in the α histogram to evaluate peak characteristics, wherein the base line has a slope that extends downwardly from a highest valley region of the respective peak to a lower point on the histogram curve within the peak range.

34. A system according to claim 32, wherein the histogram is an α-histogram that mathematically raises the selected data values by a power of α, and wherein the processor system is configured to selectively smooth minimal peaks from the α histogram to illustrate peaks having more clinical relevance and associated peak and/or range values of the peaks associated with the local histograms.

35. A system according to claim 32, wherein the processor system is configured to programmatically (a) classify and/or (b) detect tissues in the volume data set using data from the α-histogram.

36. A system according to claim 32, wherein the processor system is configured to adaptively apply a transfer function using data from the α-histogram to electronically illustrate different materials in the medical image.

37. A system according to claim 32, further comprising a user input in communication with the image processor system, the user input configured to allow a physician to interact with the volume data set and adjust visualization parameters of different tissue.

38. A system according to claim 32, wherein the processor is configured to mathematically raise selected local histogram data values by α power of α, where α is greater than 1, and automatically sum the raised local histogram data values to generate an αhistogram of spatially coherent histogram data.

39. A system according to claim 38, further comprising a display in communication with the processor, wherein the processor is configured to generate a plurality of different α histograms derived from the local histogram data, wherein some of the α histograms have different α values ranging from 2 to infinity, and wherein the different α histograms are shown on the display to illustrate increases in peak values of coherent tissue with increasing powers of α.

40. A system according to claim 38, wherein the processor is configured to electronically normalize the summed α histogram values by applying a power of $1/\alpha$.

41. A system according to claim 32, wherein the histogram is an α histogram of selected data mathematically raised by a power of α, and wherein the processor is configured to display a full histogram of the volume data set and the α histogram with an associated histogram curve and peaks with the same area as that of a full histogram of the volume data set.

42. An automated system for obtaining, archiving and generating DVR medical images, in combination with the system of claim 32, wherein the generated histogram is an α histogram that mathematically raises the selected data values by a power of α, the system further comprising:
a packing system for electronically compressing patient medical data obtained from a patient imaging modality;
electronic storage media for electronically storing patient medical data in communication with the packing system;

an unpacking system in communication with the electronic storage media; and a physician workstation in communication with the image processor system for displaying selected patient medical data, the image processor configured to accept physician interaction to electronically generate medical images in generally real-time responsive to physician input.

43. A computer program product for spatially correlating histogram data for rendering images using a computer network, the computer program product comprising:

a computer readable storage medium having computer readable program code embodied in the medium, the computer-readable program code comprising:

computer readable program code configured to generate at least one a histogram having associated peak characteristics and intensity values to identify different types of tissue having overlapping image intensity values to thereby provide data used to render a diagnostic medical image of a target region of a patient.

44. A computer program product according to claim 43, further comprising computer readable program code configured to use the at least one α histogram to automatically adapt transfer functions between data sets of unrelated or similar examination types.

45. A system for visualizing images of volume data sets, comprising:

a processor configured to generate a medical image from a voxel medical data set, the processor configured to electronically generate partial range histograms and at least one α-histogram to generate the medical image; and a clinician workstation in communication with the processor configured to display the medical image.

46. A system according to claim 45, wherein the partial range histograms are defined using data from the α-histogram.

* * * * *

UNITED STATES PATENT AND TRADEMARK OFFICE
CERTIFICATE OF CORRECTION

PATENT NO.       : 7,660,461 B2                                           Page 1 of 2
APPLICATION NO.  : 11/379696
DATED            : February 9, 2010
INVENTOR(S)      : Lundstrom et al.

It is certified that error appears in the above-identified patent and that said Letters Patent is hereby corrected as shown below:

On the Title Page,

Item [*] Notice: Subject to any disclaimer, the term of this patent is extended or adjusted under 35 U.S.C. by 748 days.

Delete the phrase "by 748 days" and insert -- by 964 days --

In the Specifications:
Column 9, Line 40, Equation 4: Please correct " $\sum_x$ " to read -- $\Sigma_x$ --

In the Claims:
Throughout the patent document "α-histogram" and "α histogram" are used interchangeably. The patent issued without a space and/or hyphen between these terms "α" and "histogram". Therefore the following are to be corrected as indicated:
Column 22, Claim 7, Line 17: Please correct "αhistogram"
        to read -- α-histogram --
        Claim 10, Line 28: Please correct "αhistogram"
        to read -- α-histogram --
        Claim 11, Line 32: Please correct "αhistogram"
        to read -- α-histogram --

Column 23, Claim 24, Line 19: Please correct "αhistogram"
        to read -- α-histogram --
        Claim 25, Lines 23, 24, 25: Please correct "αhistogram"
        to read -- α-histogram --
        Claim 26, Line 27: Please correct "αhistogram"
        to read -- α-histogram --
        Claim 26, Line 30: Please correct "a histogram"
        to read -- α histogram --
        Claim 27, Line 39: Please correct "αhistogram"
        to read -- α-histogram --

Signed and Sealed this

Twenty-seventh Day of July, 2010

David J. Kappos
*Director of the United States Patent and Trademark Office*

CERTIFICATE OF CORRECTION (continued)
U.S. Pat. No. 7,660,461 B2

Column 24, Claim 38, Line 40: Please correct "αhistogram"
       to read -- α histogram --

Column 25, Claim 43, Line 15: Please correct "a histogram"
       to read -- α histogram --